United States Patent [19]

Beck, deceased

[11] 4,275,565
[45] Jun. 30, 1981

[54] TRANSFER DEVICE FOR A CRYOGENIC MEDIUM

[75] Inventor: Rudolf K. Beck, deceased, late of Erlangen, Fed. Rep. of Germany, by Christa Beck, Thoms Beck, and Matthias Beck, heirs

[73] Assignee: Siemens Aktiengesellschaft, Berlin and Munich, Fed. Rep. of Germany

[21] Appl. No.: 49,324

[22] Filed: Jun. 18, 1979

[30] Foreign Application Priority Data

Jul. 5, 1978 [DE] Fed. Rep. of Germany ....... 2829555

[51] Int. Cl.³ .............................................. F17C 7/02
[52] U.S. Cl. .......................................... 62/55; 277/15;
285/47; 285/DIG. 5; 310/54; 310/61
[58] Field of Search ...................... 62/55; 310/54, 61;
277/15; 285/47, DIG. 5

[56] References Cited

U.S. PATENT DOCUMENTS

| 3,626,717 | 12/1971 | Lorch | 62/55 |
| 3,775,989 | 12/1973 | Mursinna et al. | 62/55 |
| 3,823,569 | 7/1974 | Sellmaier | 62/55 |
| 3,845,639 | 11/1974 | Smith, Jr. et al. | 62/55 |
| 3,865,145 | 2/1975 | McKay et al. | 138/113 |
| 4,056,745 | 11/1977 | Eckels | 62/514 JT |

*Primary Examiner*—Ronald C. Capossela
*Attorney, Agent, or Firm*—Kenyon & Kenyon

[57] ABSTRACT

A device for the transfer of a cryogenic medium between a fixed and a rotating conducting tube with a sealing device having a corotating sealing element to seal off an annular space between a fixed and a rotating section of conducting tube, in which the sealing device is disposed in the space with its radially oriented sealing element, which is fastened to the outside of the rotating section of tube, made sufficiently elastic that its radial dimension when rotating is increased by a predetermined amount to permit shrinkage differences occurring upon cooling to be equalized to a large extent so that a good seat is obtained.

9 Claims, 2 Drawing Figures

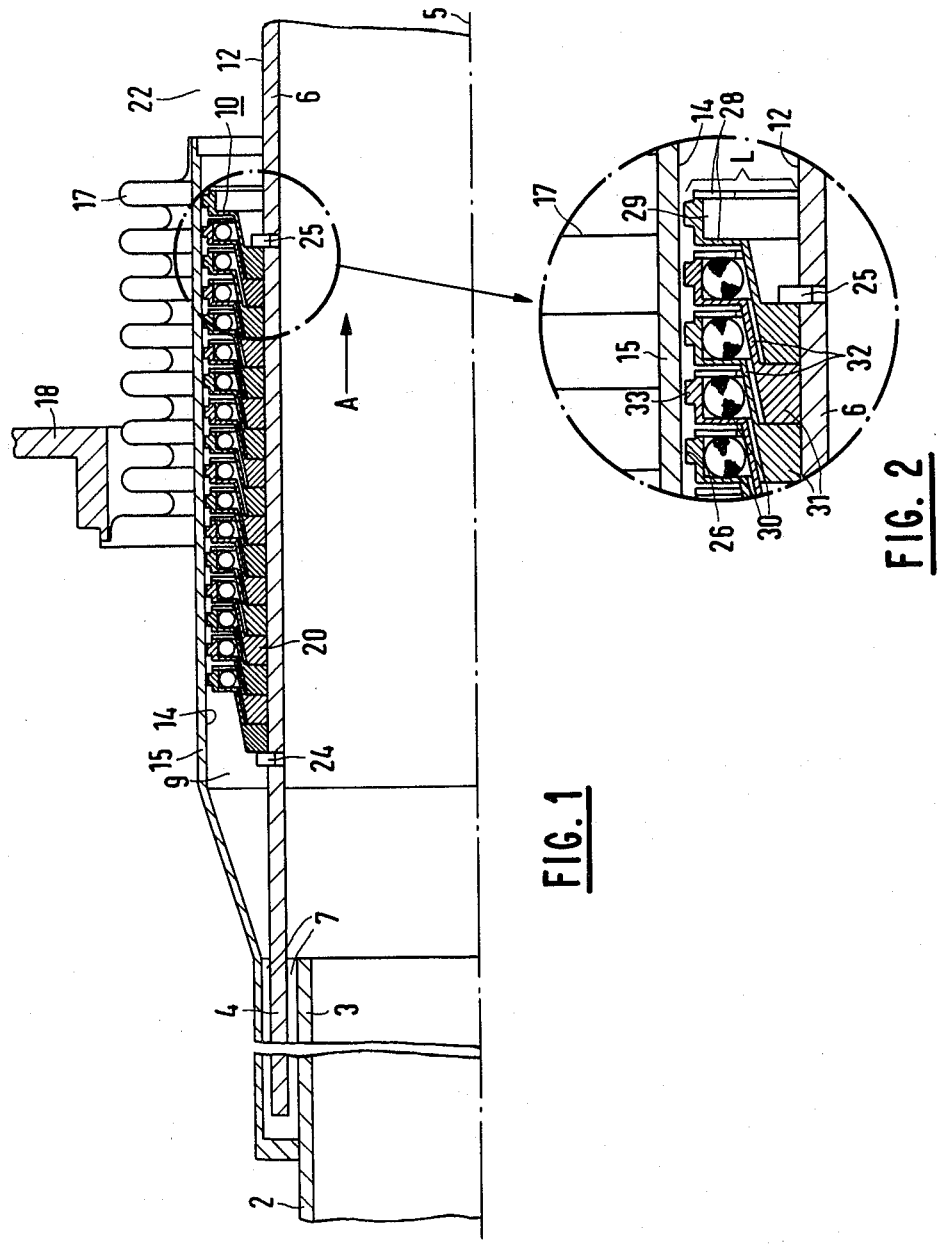

TRANSFER DEVICE FOR A CRYOGENIC MEDIUM

BACKGROUND OF THE INVENTION

This invention relates to a device for the transfer of a cryogenic medium between a fixed and a rotating conducting tube in general and more particularly to such a device having a sealing device which contains at least one corotating sealing element connected to the rotating conducting tube for sealing an annular space between a section of tube connected to the fixed conducting tube and a section of tube connected to the rotating conducting tube.

To cool a winding, particularly a superconducting winding to be deeply cooled in the rotor of an electric machine such as a turbo-generator, devices for the transfer of a cryogenic medium between the rotor and the fixed connecting lines must be provided. The cryogenic medium such as liquid or gaseous helium is carried to and from the field winding in the rotor through these transfer devices. For this purpose, the rotor of the machine contains an appropriate connecting head equipped with such a transfer device, also called a coupling. Designing this coupling is difficult especially in view of keeping thermal losses of the coolant loop for the field winding as low as possible and in view of small coolant leakage rates. The couplings must therefore have rotating seals of relatively low friction to seal the coolant, in particular the liquid helium, from the exterior on the one hand and, within the rotating system, to seal the inlet side from the outlet side on the other hand. In addition, the sealing devices required therefor must permit radial and axial rotor shaft play and function in a trouble free manner over extended periods of time, such as several years.

One transfer device of the kind mentioned at the outset is known from U.S. Pat. No. 4,056,745. This device, called a helium coupling, contains a hollow cylindrical, stationary housing with a tubular feed line projecting into its interior. The open end section of this feed tube is concentrically enclosed by an end section of a conducting tube rigidly joined to the rotating parts of the machine so that an annular gap is formed between these two tubes. The concentric position of the two pieces of tube within the housing is assured by bearings provided for this purpose. To prevent helium from escaping to the outside through the gap, an annular supporting part for a sealing ring extending in a direction parallel to the axis is provided on the face of the rotating tube. This sealing ring slides on a radically extending shaped sealing surface, of a structural part connected to the stationary housing.

Consequently, the sealing device of the known coupling represents a slide ring seal. In such a seal a corotating sealing element extending essentially in an axis-parallel direction slides on a washer-shaped sealing surface extending in a radial plane. To be able to well seal the space formed between the two sections of tube disposed concentrically to each other, the corotating sealing ring of the known machine must slide on the sealing surface under a certain pressure. Severe wear of the sealing ring cannot be avoided under these circumstances. This wear, which is particularly great when the seal is operated in the dry state, leads to a limitation of the operating life of the coupling because through it the seal characteristics deteriorate with progressing operating time, unless an automatic readjustment of the supporting part of the sealing ring is provided. Furthermore, such sealing rings generally consist of materials which, upon cooling of the coupling, shrink more than the latter's metallic components so that a shortening of the sealing rings occurs for this reason also. An automatic readjusting device, which can be installed only at relatively high expense, would be unnecessary if a whole row of slide ring seals with sealing rings extending in a direction parallel to the axis could be provided. Disposing such a row in a coupling is very costly, however.

SUMMARY OF THE INVENTION

Therefore, it is an object of the present invention to improve the known device for the transfer of a cryogenic medium so that the difficulties mentioned above either do not occur at all or occur only to an insignificant extent. In particular, the sealing device should be designed so as to permit a long operating life without impairment of the sealing characteristics while, at the same time shrinkage differences occuring upon cooling are equalized.

For a transfer device of the type mentioned at the outset this problem is solved by disposing the sealing device in the annular space by fastening its sealing element to the outside of the rotating piece of tube so that it extends essentially radially relative to the axis of rotation and by making the sealing element of a predetermined material which is sufficiently plastic that its radial dimension is increased by a predetermined amount when the section of tube to which it is connected rotates.

The advantages of this transfer device design are, in particular, that the radial dimension of its corotating sealing element can be increased as a function of the rotation of the section of tube to which it is connected in such a manner that radial shrinkage differences occurring upon cooling are at least approximately equalized. The connected machine is thus well sealed during operation.

Moreover, the sealing device may advantageously contain several sealing elements which are disposed one behind the other in the axial direction and fastened to the rotating section of tube, and which may be designed in particular as sealing lips. By this measure, the flow resistance can be increased even in the presence of a small gap between each sealing element and the associated sealing surface on the inside of the fixed piece of tube, so that sufficient sealing action is still assured. Such a gap may expediently by provided for particularly wear resistant sealing devices.

Furthermore, outer part of the sealing elements away from the axis may advantageously contain a hollow groove open towards the inside, in which groove a ballast is disposed. Lead balls, for example, may be used as ballast. If the mass of the ballast is suitabley chosen, a predetermined radial expansive force can be exerted on each sealing element, based on a correspondingly centrifugal force.

An elastic expansion of the sealing elements on the basis of centrifugal forces can advantageously be achieved by the provision that each sealing element contains a part near the axis, fastened to the rotating section of tube, and an outer part, remote from the axis, interconnected by a thin walled intermediate part in the form of a truncated conical shell.

BRIEF DESCRIPTION OF THE DRAWING

FIG. 1 illustrates a single transfer device according to the present invention schematically.

FIG. 2 shows an enlarged view of the sealing arrangement of FIG. 1.

DETAILED DESCRIPTION OF THE INVENTION

IN FIG. 1 only the upper portion of a longitudinal section through a transfer device is shown. A cryogenic medium A, such as liquid helium from an external refrigeration machine can be introduced at the connection head, not detailed in the Figure, to the rotor of an electric machine such as a turbogenerator to be fed there to a super-conducting field winding for cooling. The flow direction of the cryogenic medium A is indicated by an arrow in the Figure. The transfer device at the machine's connection head contains a tubular, stationary conducting tube 2 whose open end section 3 is enclosed by the end section 4 of a conducting tube 6 disposed concentrically relative to a common axis 5. It is into this conducting tube 6, which is designed as a hollow shaft and rigidly joined to the rotating rotor parts and which consists of a nonmagnetic steel, for example, that the cryogenic medium A is transferred.

An annular gap 7 is provided between the corotating end section 4 and the fixed end section 3 in order to allow for radial rotor shaft play. The cryogenic medium could escape to the outside through the gap 7. To prevent the medium, evaporated helium gas, for instance, from escaping, the gap 7 is connected in a gastight manner to space 9 in which a sealing device 10 is located. This space 9 is formed between the outside 12 of the corotating hollow shaft 6 and the inside 14 of a thin walled, hollow cylinder 15 connected to the fixed conducting tube 2. The inside 14 of this hollow cylinder 15 which consists, for example, of a corrosion resistant nonmagnetic steel is expediently polished. Through an elastic, static sealing element, such as a thin walled metal bellows 17, the hollow cylinder is fastened to a partition 18, shown only in part, of the connecting head of the rotor. Therefore, the hollow cylinder 15 can move slightly in the radial direction. In addition to its sealing function, the sealing device 10 thus additionally assumes the function of supporting this hollow cylinder. A separate, centering bearing between the hollow cylinder 15 and the hollow shaft 6 then becomes unnecessary.

The sealing device 10 in the annular interspace 9 extending in a direction parallel to the axis contains several sealing elements, disposed in the axial direction one after the other, designed in the form of annular sealing lips 20 for sealing the gap 7 from the outside 22. In this outside space a vacuum may be provide, or it may also carry another cryogenic medium such as helium gas.

The sealing lips advantageously consist of a material having a relatively small coefficient of friction at cryogenic temperatures of, say, 4 K. Moreover, the friction of the sealing lips can be reduced further by the polished inside 14 of the hollow cylinder 15 consisting, for example, of a corrosion resistant, nonmagnetic metal. The rate of wear of the sealing lips is then correspondingly low. Furthermore, the sealing lip material advantageously has a modulus of elasticity which increases but little with decreasing temperature and, at cryogenic temperatures, still has a ductility in the elastic range amounting to a multiple of the shrinkage taking place upon cooling. Materials satisfying these requirements are, for instance, special polyimides (such as Dupont's VESPEL, particularly Types SP1 and SP21) as well as polytetrafluoroethylenes.

If applicable, fillers may also be admixed to these materials to improve the dry running properties of the sealing lips on the material of the hollow cylinder 15. Carbon, graphite, bronze, or glass, for instance, are suitable fillers.

When assembling the transfer device in its still warm state, a multiplicity of sealing lips 20 is mounted one after the other on the hollow shaft 6 and clamped between two annular retaining elements 24 and 25. Since the sealing lip material has a shrinkage coefficient greater than that of the material of the hollow shaft 6, the sealing lips are shrunk fit on the hollow shaft 6 upon cooling, thus becomeing self retaining. In addition, the sealing lips may be secured, particularly against turning.

Due to the radial shrinkage differences between the sealing lips 20 on the one hand and the materials of the hollow shaft 6 and of the hollow cylinder 15 on the other, there develops, between the outer sealing surfaces 26 of the sealing lips 20 and the inner wall 14 of the hollow cylinder 15, when the machine is standing still and is being cooled, a narrow gap which leads to a worsening of the sealing characteristics of the sealing device 10. In general, the shrinkage differences range between 0.4 and 0.7%. However, special measures are provided according to the present invention so that such a gap can be compensated for or at least be reduced substantially during the operation of the machine, i.e. when the rotor is rotating. This is accomplished by increasing the radial length L of the sealing lips 20 by a predetermined amount when the hollow shaft 6 rotates. The radial overall length of each sealing lip can then, for instance, exactly equal the distance between the two concentric hollow cylinders 6 and 15. But, it may also be provided for the overall length to be slightly greater so that the sealing lips extending between the two components then make contact with the inside 14 of the hollow cylinder 15 with a predetermined force.

The predetermined radial distension of each sealing lip 20 during rotation can be achieved in particular by the feature that the cross-sectional area of the outer sealing lip part 28 facing the sealing surface 14 is kept relatively small. In addition, this outer part may be designed so that a hollow profile 29 open towards the inside is formed. In this hollow profile a ballast consisting, for example, of small lead balls 30, may then be disposed. Due to the centrifugal forces acting upon it, this ballast leads to a radial distension of the sealing lips. This distension can be predetermined at the intended speed of the hollow shaft 6 by a suitable selection of the sealing lip material. The radial distensibility of the sealing lips 20 can be further supported advantageously by providing, between each of their inner parts 31 in contact with the hollow shaft 6 and their outer parts 28 equipped with the ballast, a thin walled transitory part 32 having the shape of a truncated conical shell. If applicable, a radial distension at these transitory parts 32 can further be facilitated by giving them a wavy shape when producing them in a press die. Due to the fact that the annular sealing lips provided with their tapered transitory parts can be nested in each other, their pitch is smaller than their radial overall length. In addition, the ballast balls 29 are prevented from falling out by the next sealing lip. It is expedient for the last sealing lip to contain no ballast.

In addition, the sealing outer edge of the outer part 28 of each sealing lip 20 may be designed in the form of a narrow sealing stip 33 which allows a certain amount of wear. The cross-sectional area of the sealing lip then decreases advantageously with increasing wear. But this is associated with greater elongation so that the formation of a free gap between the sealing lip and the inside wall 14 of the hollow cylinder is prevented. This can also be influenced additionally by an appropriate design of the profile of the sealing stips 33. For instance, sealing strips of triangular profile may be provided.

The illustrated embodiment according to the present invention is based on the premise that there is practically no temperature gradient across the sealing device 10 in a direction parallel to the axis so that an approximately equal radial distension of all sealing lips 20 takes place. But the sealing device does not have to be designed this way. In case a temperature drop of, say, 100 to 200 K is provided, the temperature dependent, different shrinkage of the sealing lips can be compensated in a simple manner by appropriately adapting the masses of the ballast 30 in the individual sealing lips 20.

What is claimed is:

1. In a sealing device for establishing a seal at the point of transfer of a cryogenic medium between a stationary conducting tube and a rotating conducting tube, a section of the stationary tube surrounding a secton of the rotating tube and forming therewith an annular space, in which at least one sealing element which is made of an elastic material is disposed, the improvement comprising:

said sealing element being fastened to the outside of said section of the rotating tube so that it extends essentially radially relative to the axis of rotation, and said sealing element made of a material which is sufficiently elastic to permit its radial dimension to increase by a predetermined amount when the section of tube to which it is connected rotates.

2. The improvement according to claim 1, wherein said sealing device includes several sealing elements disposed one after the other in the axial direction and fastened to the rotating section of tube.

3. The improvement according to claim 2, wherein the outer part of the sealing element, away from the axis, contains a hollow groove open towards the inside, and further including ballast disposed in said groove.

4. The improvement according to claim 3, wherein at least some of the sealing elements disposed one after the other in the axial direction are at different temperature levels and wherein different weights of ballast, adapted to the temperature level of the respective sealing element are disposed in said hollow groves, open towards the inside, of the sealing elements.

5. The improvement according to claim 3 wherein said ballast comprises lead balls.

6. The improvement according to claim 1 wherein said sealing element includes a sealing lip.

7. The improvement according to claim 1 wherein said sealing element contains an inner part, near the axis, fastened to the rotating section of tube, and an outer part, remote from the axis, and a thin walled intermediate part in the form of a truncated conical shell connecting said inner and outer parts.

8. The improvement according to claim 1 wherein an outer part of the sealing element contains a sealing strip at its outer edge.

9. The improvement according to claim 1 wherein an outer part of the sealing element has a small cross-section area.

* * * * *